(12) United States Patent
Shwartsman et al.

(10) Patent No.: US 9,405,545 B2
(45) Date of Patent: Aug. 2, 2016

(54) METHOD AND APPARATUS FOR CUTTING SENIOR STORE LATENCY USING STORE PREFETCHING

(75) Inventors: Stanislav Shwartsman, Haifa (IL); Melih Ozgul, Hillsboro, OR (US); Sebastien Hily, Portland, OR (US); Shlomo Raikin, Ofer (IL); Raanan Sade, Kibutz Sarid (IL); Ron Shalev, Ceaseria (IL)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 13/993,508

(22) PCT Filed: Dec. 30, 2011

(86) PCT No.: PCT/US2011/068208
§ 371 (c)(1),
(2), (4) Date: Jun. 12, 2013

(87) PCT Pub. No.: WO2013/101213
PCT Pub. Date: Jul. 4, 2013

(65) Prior Publication Data
US 2014/0223105 A1 Aug. 7, 2014

(51) Int. Cl.
*G06F 12/08* (2016.01)
*G06F 9/38* (2006.01)

(52) U.S. Cl.
CPC .............. *G06F 9/3814* (2013.01); *G06F 9/383* (2013.01); *G06F 9/3834* (2013.01);
(Continued)

(58) Field of Classification Search
CPC ............ G06F 12/0808; G06F 12/0862; G06F 2212/6028; G06F 9/383; G06F 9/3834; G06F 9/3861; G06F 2212/12
See application file for complete search history.

(56) References Cited

U.S. PATENT DOCUMENTS 5,664,137 A * 9/1997 Abramson .......... G06F 9/30043
712/216
5,996,071 A * 11/1999 White ................... G06F 9/3812
712/207

(Continued)

FOREIGN PATENT DOCUMENTS

TW 1469047 B 1/2015

OTHER PUBLICATIONS

PCT International Search Report for PCT Counterpart Application No. PCT/US2011/068208, 3 pgs., (Sep. 27, 2012).

(Continued)

*Primary Examiner* — Jared Rutz
*Assistant Examiner* — Jean Edouard
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for cutting senior store latency using store prefetching. For example, in one embodiment, such means may include an integrated circuit or an out of order processor means that processes out of order instructions and enforces in-order requirements for a cache. Such an integrated circuit or out of order processor means further includes means for receiving a store instruction; means for performing address generation and translation for the store instruction to calculate a physical address of the memory to be accessed by the store instruction; and means for executing a pre-fetch for a cache line based on the store instruction and the calculated physical address before the store instruction retires.

22 Claims, 14 Drawing Sheets

(52) U.S. Cl.
CPC ......... *G06F 9/3861* (2013.01); *G06F 12/0808* (2013.01); *G06F 12/0862* (2013.01); *G06F 2212/6028* (2013.01); *G06F 2212/62* (2013.01)

(56) References Cited

U.S. PATENT DOCUMENTS

| | | | | |
|---|---|---|---|---|
| 6,094,719 | A * | 7/2000 | Panwar | G06F 9/30014 708/513 |
| 6,216,215 | B1 * | 4/2001 | Palanca et al. | 712/23 |
| 6,266,744 | B1 * | 7/2001 | Hughes | G06F 9/3834 711/123 |
| 6,449,693 | B1 * | 9/2002 | Goetz et al. | 711/122 |
| 6,594,734 | B1 * | 7/2003 | Kyker | G06F 9/3812 711/125 |
| 6,643,745 | B1 * | 11/2003 | Palanca | G06F 9/383 711/137 |
| 6,742,082 | B1 * | 5/2004 | Lango et al. | 711/118 |
| 7,383,409 | B2 | 6/2008 | Steely, Jr. et al. | |
| 8,826,141 | B2 * | 9/2014 | Dimitrov | 715/738 |
| 8,832,288 | B1 * | 9/2014 | Mahkovec et al. | 709/229 |
| 2002/0035677 | A1 * | 3/2002 | Sheaffer | G06F 9/3836 712/217 |
| 2002/0056027 | A1 * | 5/2002 | Kanai et al. | 711/137 |
| 2002/0138714 | A1 * | 9/2002 | Leibholz | G06F 9/3836 712/217 |
| 2003/0084259 | A1 * | 5/2003 | Palanca et al. | 711/163 |
| 2003/0149862 | A1 * | 8/2003 | Kadambi | G06F 9/3838 712/217 |
| 2003/0149865 | A1 * | 8/2003 | Kadambi | G06F 9/3867 712/244 |
| 2004/0128448 | A1 * | 7/2004 | Stark et al. | 711/137 |
| 2006/0248319 | A1 * | 11/2006 | Kadambi | G06F 9/322 712/234 |
| 2008/0263331 | A1 * | 10/2008 | Le et al. | 712/217 |
| 2009/0157943 | A1 * | 6/2009 | Robinson | G06F 9/3834 711/100 |
| 2010/0106907 | A1 * | 4/2010 | Noguchi et al. | 711/114 |
| 2010/0146247 | A1 * | 6/2010 | Ban | G06F 9/3855 712/226 |
| 2010/0205415 | A1 * | 8/2010 | Henry | G06F 9/3867 712/234 |
| 2010/0306509 | A1 * | 12/2010 | Day | G06F 9/30174 712/217 |

OTHER PUBLICATIONS

PCT Written Opinion of the International Searching Authority for PCT Counterpart Application No. PCT/US2011/068208, 5 pgs., (Sep. 27, 2012).
PCT Notification concerning Transmittal of International Preliminary Report on Patentability (Chapter I of the Patent Cooperation Treaty) for PCT Counterpart Application No. PCT/US2011/068208, 7 pgs., (Jul. 10, 2014).
Taiwan IPO Search Report from counterpart application No. Taiwan Patent Application No. 101148745, mailed Aug. 26, 2014.

* cited by examiner

METHOD AND APPARATUS FOR CUTTING SENIOR STORE LATENCY USING STORE PREFETCHING

CROSS-REFERENCE TO RELATED APPLICATION

This patent application is a U.S. National Phase Application under 35 U.S.C. §371 of International Application No. PCT/US2011/068208, filed Dec. 30, 2011, entitled METHOD AND APPARATUS FOR CUTTING SENIOR STORE LATENCY USING STORE PREFETCHING.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for cutting senior store latency using store prefetching.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Generally speaking, memory closer to a CPU may be accessed faster than memory farther away. Memory within a CPU may be referred to as cache, and may be accessible at different hierarchical levels, such as Level 1 cache (L1 cache) and Level 2 cache (L2 cache). System memory such as memory modules coupled with a motherboard may also be available, such externally available memory which is separate from the CPU but accessible to the CPU may be referred to as, for example, off-chip cache or Level 3 cache (L3 cache), and so on, however, this is not always consistent as a third hierarchical level of cache (e.g., L3 cache) may be on-chip or "on-die" and thus be internal to the CPU.

CPU cache, such as L1 cache, is used by the central processing unit of a computer to reduce the average time to access memory. The L1 cache is a smaller, faster memory which stores copies of the data from the most frequently used main memory locations. L2 cache may be larger, but slower to access. And additional memory, whether on-chip or externally available system memory used as cache may be larger still, but slower to access then smaller and closer CPU cache levels. As long as most memory accesses are cached memory locations, the average latency of memory accesses will be closer to the cache latency than to the latency of main memory.

Conventional caches utilize a store buffer to reduce cache latency and also to enable the reading of store instructions that have not yet been written into cache. As stores go down a pipeline they store the data in a store buffer and persist until the store is retired from the pipeline, at which point the store writes the data to cache.

Conventional cache mechanisms require that store instructions be instituted through a series of operations which are executed in serial steps. Instructions are decoded and forwarded to an address generation unit, an address is calculated, and then sent to the cache which must maintain the order the instructions serially to carry out the store.

Moreover, the stored data cannot be made available to other entities until absolutely certain that the store is actually going to persist until retirement, at which point the store instruction "retires" from the pipeline thus allowing the stored data to be written from a store buffer to the cache location and it is at this post retirement stage of operation that the data is considered valid.

Because an out of order machine or processor executes instructions "out of order," it cannot be known with certainty whether any given instruction will be part of a validly executed path. For example, where an instruction is executed ahead of a branch, there is a risk that such an instruction will never be used, should a branch mis-prediction occur. Thus, problems arise with data integrity if a store writes data into a cache before it is known with certainty whether or not the store instruction will retire from the cache, and thus correspond to valid data. A store instruction which never retires, yet writes to the cache, causes invalid data to be written to the cache and thus creates a data integrity problem. Unfortunately, retirement occurs at a late stage, and thus, induces cache latency for such store instructions.

Improvements to cache latency (e.g., reductions in cache latency) provide direct and immediate benefits to computational efficiency for an integrated circuit utilizing such a cache. Lower latency means that data required by, for example, a CPU pipeline is available sooner without having to expend cycles waiting for unavailable data.

The present state of the art may therefore benefit from systems and methods for cutting senior store latency using store prefetching as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
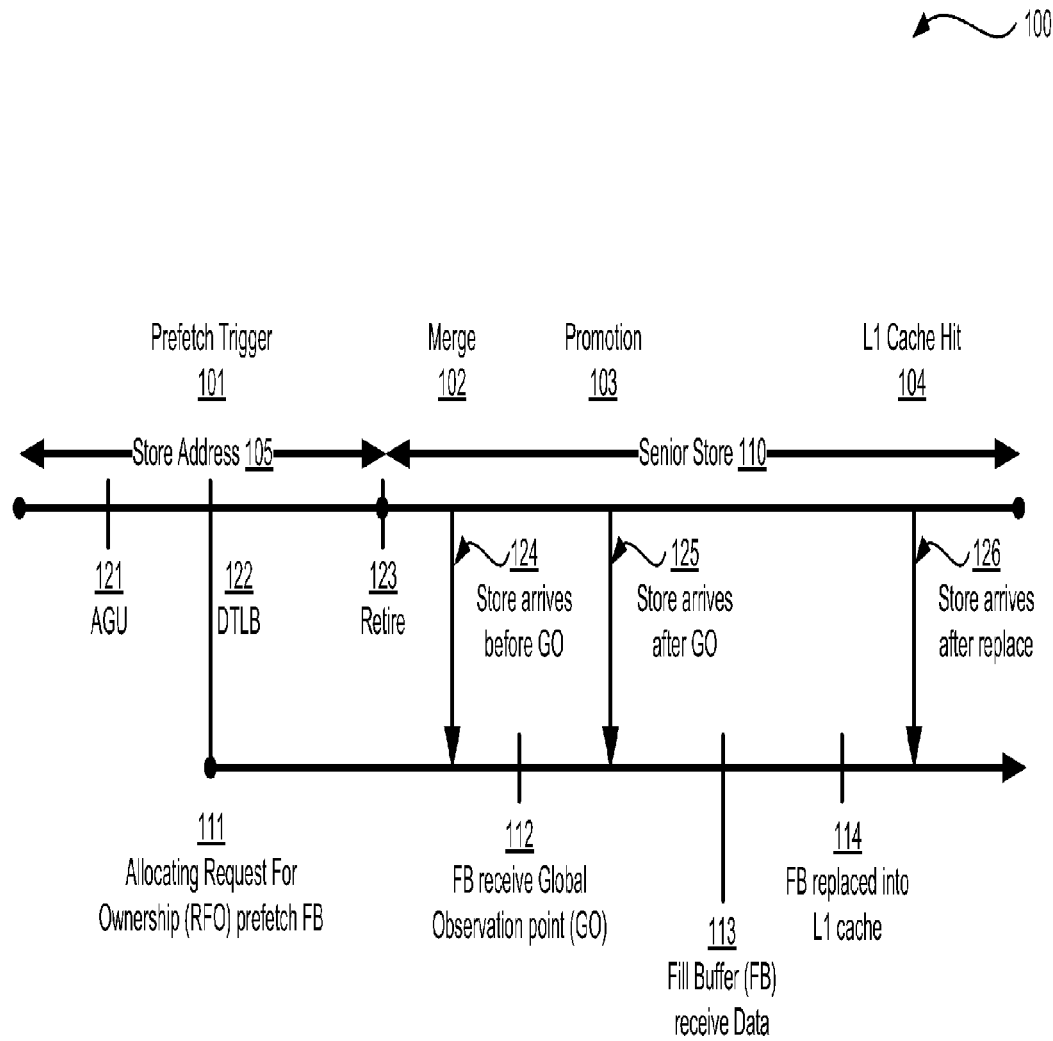
FIG. 1 illustrates an exemplary architecture in accordance with which embodiments may operate.

Described herein are systems and methods for cutting senior store latency using store prefetching. For example, in one embodiment, such means may include an integrated circuit or an out of order processor means that processes out-of-order instructions and enforces in-order requirements for a cache. Such an integrated circuit or out of order processor means further includes means for receiving a store instruction; means for performing address generation and translation for the store instruction to calculate a physical address of the memory to be accessed by the store instruction; and means for executing a pre-fetch for a cache line based on the store instruction and the calculated physical address before the store instruction retires.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate.

In modern out-of-order micro-architectures store instructions must nevertheless be executed in-order so as to maintain data integrity which could arise should a store instruction cause data to be written to cache out of order and then fail to retire, thus rendering the data written to cache as erroneous. Such an issue occurs because 1) a write operation to the cache is destructive and cannot be rolled back in the case of a mis-speculation; and 2) conventional x86 architecture memory ordering rules require that store operations be visible strictly in-order.

Actual store writes to the cache are not permitted until the store instruction is retired and the store becomes senior. Described mechanisms to reduce senior store lifetime are therefore proposed which in turn improves cache latency and overall performance. A senior store 110 means that the store instruction has passed retirement and is no longer speculative as it is known with certainty that the store instruction is going to execute (e.g., software has already executed the instruction) and thus, the data must be written to cache to ensure data integrity.

Senior store lifetime is reduced by prefetching ahead the data that a senior store is going to access. Rather than issuing a Request For Ownership (RFO) request after the arrival of a senior store to the cache, an RFO prefetch request is issued during the store address execution time immediately after the store instruction physical address is known. For example, with reference to the exemplary architecture 100 of FIG. 1, a "store address" 105 phase is followed by the "senior store" 110 phase. The RFO prefetch request may be issued using a hardware prefetching engine or issued directly to the cache.

Some cache mechanisms may lack sufficient distance between the RFO prefetch and the senior store 110 such that the senior store would reach the Fill Buffer (FB) processing the RFO prefetch request before the RFO prefetch completes. Therefore, in accordance with the described embodiments, a promotion 103 mechanism is further disclosed which converts a Fill Buffer (FB) allocated for the RFO prefetch into a demand senior store FB while maintaining strong x86 memory ordering requirements, thus allowing the senior store 110 to complete earlier and deallocate its store buffer entry. The disclosed technique does not attempt to guess in advance what the next address a store is going to access (as some variants of a pre-fetcher may), and thus, there is no risk of a mis-speculation.

Various events and their relative relationships to each other are depicted by the exemplary architecture 100 of FIG. 1. Within the store address 105 phase, Address Generation Unit (AGU) 121 precedes the pre-trigger 101 event which corresponds with the allocating RFO prefetch FB 111. Data Translation Lookaside Buffer (DTLB) 122 event and Retire 123 complete the store address 105 phase. Merge 102 is depicted in the senior store 110 phase as is promotion 103 followed by an L1 cache hit 104. Event 124 corresponding to a store arrives before Global Observation point (GO) event precedes a FB receives GO event 112, followed by a store arrives after GO event 125 which precedes the FB receive data event 113 and the FB replaced into L1 cache event 114, which is followed by the store arrives after replace event 126.

If the store instruction writes to cache immediately after retirement, then operation is already after the Global Observation point, and thus, the store instruction may write to the cache without special handling. The allocating the RFO prefetch FB event 111 performs a prefetch store request based on a physical address to get write authority, and thus establishes an independent pipeline for the prefetch. After a time, the senior store 110 arrives. If the senior store 110 arrives before the prefetch request Global Observation point then merge event 102 is initiated. If the senior store 110 arrives after prefetch has already received its Global Observation point then promotion event 103 is initiated. If the senior store 110 arrives after prefetch is replaced, then no special handling is required.

Figure 2:
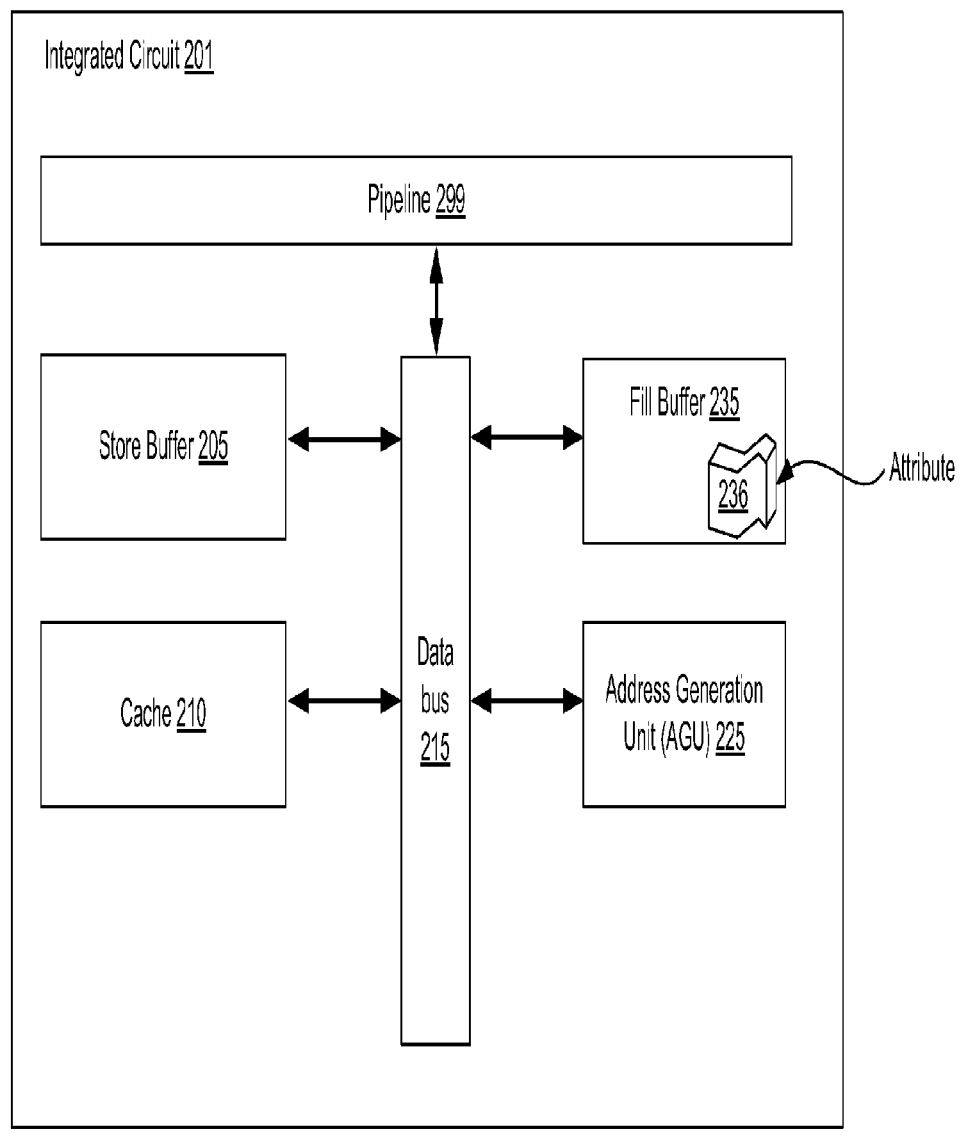
FIG. 2 illustrates an alternative exemplary architecture in accordance with which embodiments may operate.

FIG. 2 illustrates another alternative exemplary architecture 200 in accordance with which embodiments may operate. For example, an integrated circuit 201 is depicted as having pipeline 299, store buffer 205, cache 210, fill buffer 235 with attribute 236, Address Generation Unit (AGU) 225, each of which are communicably interfaced to the data bus 215 of integrated circuit 201.

In accordance with one embodiment, the integrated circuit 201 implements an out-of-order processor. In such an embodiment, a pipeline 299 the out-of-order processor receives a store instruction. In such an embodiment, the out-of-order processor enforces in-order requirements for a cache 210. The out-of-order processor further performing address generation and translation for the store instruction to calculate a physical address of the memory to be accessed by the store instruction, for example, via an Address Generation Unit 225 and executing a pre-fetch for a cache line based on the store instruction and the calculated physical address before the store instruction retires, for example, via fill buffer 235.

In one embodiment, the integrated circuit 201 includes a Central Processing Unit (CPU). In one embodiment, the central processing unit operates as a CPU or an out-of-order processor CPU for one of a tablet computing device or a smartphone.

In one embodiment, receiving the store instruction at the out-of-order processor includes receiving the store instruction at the pipeline 299 of the out-of-order processor.

In one embodiment, the integrated circuit 201 executes the pre-fetch for the cache line before the store instruction retires by executing the pre-fetch for the cache line before the store instruction retires from the pipeline 299. In one embodiment, the store instruction is subject to one of the following events: (a) retirement from the pipeline 299 pursuant to an accurate instruction prediction or (b) a pipeline flush event pursuant to an instruction mis-prediction. In one embodiment, the pipeline flush event results in the store instruction being rendered obsolete. For example, if the store instruction is flushed from the pipeline before retirement, it will never retire, and thus, the data corresponding to the store instruction will not be valid.

In one embodiment, the fill buffer executes the pre-fetch for the cache line by requesting write authority to the cache line within the cache 210. In one embodiment, the cache 210 includes a Level 1 cache (L1 cache); and executing the pre-fetch for the cache line results in a cache miss at the L1 cache. In such an embodiment, executing the pre-fetch for the cache line further includes one or more of: (a) executing the pre-fetch against a higher level cache (e.g., such as an Level 2 cache, a Level 3 cache, etc.) responsive to the cache miss; or (b) executing the pre-fetch against a system non-cache random access memory (RAM) communicably interfaced with the out-of-order processor responsive to the cache miss. For example, there may be no cache level of integrated circuit 201 that contains the cache line, and thus, the data must be retrieved from system memory or RAM, and in particular, non-cache RAM. In one embodiment, the fill buffer 235 further loads the cache line into the cache 210 with write authority responsive to executing the pre-fetch for the cache line.

In order to reduce latency on a cache miss, it is advantageous to initiate a pre-fetch trigger (as shown at event 101 of FIG. 1) for the required cache line. Issuing the pre-fetch operation (e.g., allocating RFO prefetch FB at event 111) in advance of the store instruction retiring from the pipeline allows the required cache line to be retrieved and made available in the cache 210 before the store instruction would ordinarily even attempt to perform the cache write. Such a technique can be especially advantageous if the pre-fetch must go all the way out to system RAM at which point latency will be about 200 cycles. The pre-fetch leverages a trick of timing to cause the retrieval of the cache line which in turn reduces latency for the eventual cache write to the cache 210 upon retirement of the store instruction to approximately 5 cycles. Without the pre-retirement pre-fetch of the cache line, a cache miss would require the cache write to wait (inducing latency) until the cache line is retrieved in a serial fashion subsequent to retirement of the store instruction, then execute an RFO to attain write authority, and finally conduct the actual write to the cache 210.

Most pre-fetch algorithms attempt to perform a predictive guess of what data will be needed and then issue a reads for the corresponding addresses based on the predictive guess. Unfortunately, such a mechanism is not always accurate and is therefore subject to the severe latency associated with a cache miss and then a serial retrieval, RFO request, and eventual cache write.

In accordance with one embodiment, the store buffer 205 writes the cache line into the cache 210 after the store instruction retires and deallocating the store buffer 205 allocated to, or associated with, the cache line. Because the cache line is written to cache 210 only after retirement, the actual address is known well in advance of attempting the cache write. The store address is known in the pipeline 299 very early, specifically, at execution time (refer to store address 105 phase of FIG. 1). Execution always occurs in advance of retirement and sometimes occurs much earlier, tens to potentially hundreds of cycles earlier. Accordingly, the physical address may be utilized, without having to rely upon predictive guessing, to execute the pre-fetch operation.

In certain situations, pre-fetch alone is not sufficient due to a necessity to enforce ordering requirements for the integrated circuit 201. In an effort to complete the cache write and deallocate from the store buffer 205 as quickly as possible, the pre-fetch is issued as early as feasible, such as immediately after the store instruction physical address is known. However, if the pre-fetch is not yet complete when the senior store (e.g., see senior store 110 phase of FIG. 1) arrives, and the pre-fetch is still working to bring the required cache line into the cache 210, then the store buffer 205 cannot be deallocated.

Thus, in accordance with one embodiment, the integrated circuit 201 further (a) identifies a pre-existing pre-fetch operation for the same cache line and (b) promotes the pre-existing pre-fetch operation to a senior store. In such an embodiment, the integrated circuit 201 promotes the pre-existing pre-fetch operation to the senior store by (a) identifying a fill buffer 235 allocated to bring the cache line from a memory (e.g., a higher cache or separate system memory) into the cache 210 pursuant to the pre-existing pre-fetch operation; and (b) by further modifying an attribute 236 of the fill buffer 235 from indicating a pre-fetch operation to indicating a senior store operation. In such an embodiment, promoting the pre-existing pre-fetch operation to the senior store fulfills the pre-fetch for the cache line.

The promotion mechanism (e.g., see promotion event 103 of FIG. 1) provides a special handling mechanism to evaluate a store that comes to the cache 210 and encounters an already existing prefetch to bring to the same line, thus resulting in a contention problem. So as to overcome the contention, the fill buffer 235 working on retrieving the same cache line is taken over and converted from the pre-existing pre-fetch operation and into a senior store by modifying the appropriate attribute 236 of the fill buffer. Modification of attribute 236 thus causes the buffer to appear and operate as though it had been a senior store operation from the outset.

Thus, in accordance with a particular embodiment, the integrated circuit 201 promotes the pre-existing pre-fetch operation to the senior store by (a) determining the pre-fetch for the cache line has not completed; (b) by further identifying a fill buffer 235 allocated to bring the cache line from a memory into the cache 210 pursuant to the pre-existing pre-fetch operation; and (c) by further overwriting an attribute of the fill buffer 235 from indicating the pre-existing pre-fetch operation with an attribute indicating a senior store. In such an embodiment, promoting the pre-existing pre-fetch operation to the senior store again fulfills the pre-fetch for the cache line.

In accordance with one embodiment, the out-of-order processor or integrated circuit 201 enforces the in-order requirements for a cache 210 by requiring that stores to the cache 210 in fulfillment of store instructions received at the out-of-order processor are made visible external to the out-of-order processor in strict order. In such an embodiment, the strict order is identical in sequence to a program order being executed by the out-of-order processor. That is, the order of execution of, for example, an application or other software will correspond to the order in which store instructions retire from the pipeline 299 and in which stores are eventually written to cache 210. In one embodiment, a real linked list of the order in the fill buffer 235 is maintained in support of enforcing the in-order cache requirements.

In accordance with one embodiment, the out-of-order processor or integrated circuit 201 further (a) determines the pre-fetch for the cache line has not completed; (b) determines a Global Observation point (GO) has been reached for the pre-fetch; and (c) hides a Global Observation point from being visible external to the out-of-order processor preventing access to the cache line from entities external to the out-of-order processor. In such an embodiment, the out-of-order processor or integrated circuit 201 may further (d) determine all previous senior stores are associated with a corresponding Global Observation point and (e) un-hide (e.g., make visible) the Global Observation point for the pre-fetch allowing the pre-fetch to receive a Global Observation point time-stamp subsequent to all previous stores to ensure in-order requirements of the out-of-order processor.

Thus, a GO point is reached but the pre-fetch has not yet completed, then guarantees must be instituted to ensure compliance with strict order with every previous store. Thus, GO point is hidden from the main memory, from the program, etc., until such time that all previous senior stores receive their own GO. After such time, the pre-fetch operation will be allowed to receive its own GO time stamp and become visible. Thus, even if a GO is feasibly available, the GO will not be strict order compliant, and thus, it is hidden from entities external to the out-of-order processor or integrated circuit 201 responsible for maintaining ordering compliance.

Figure 3:
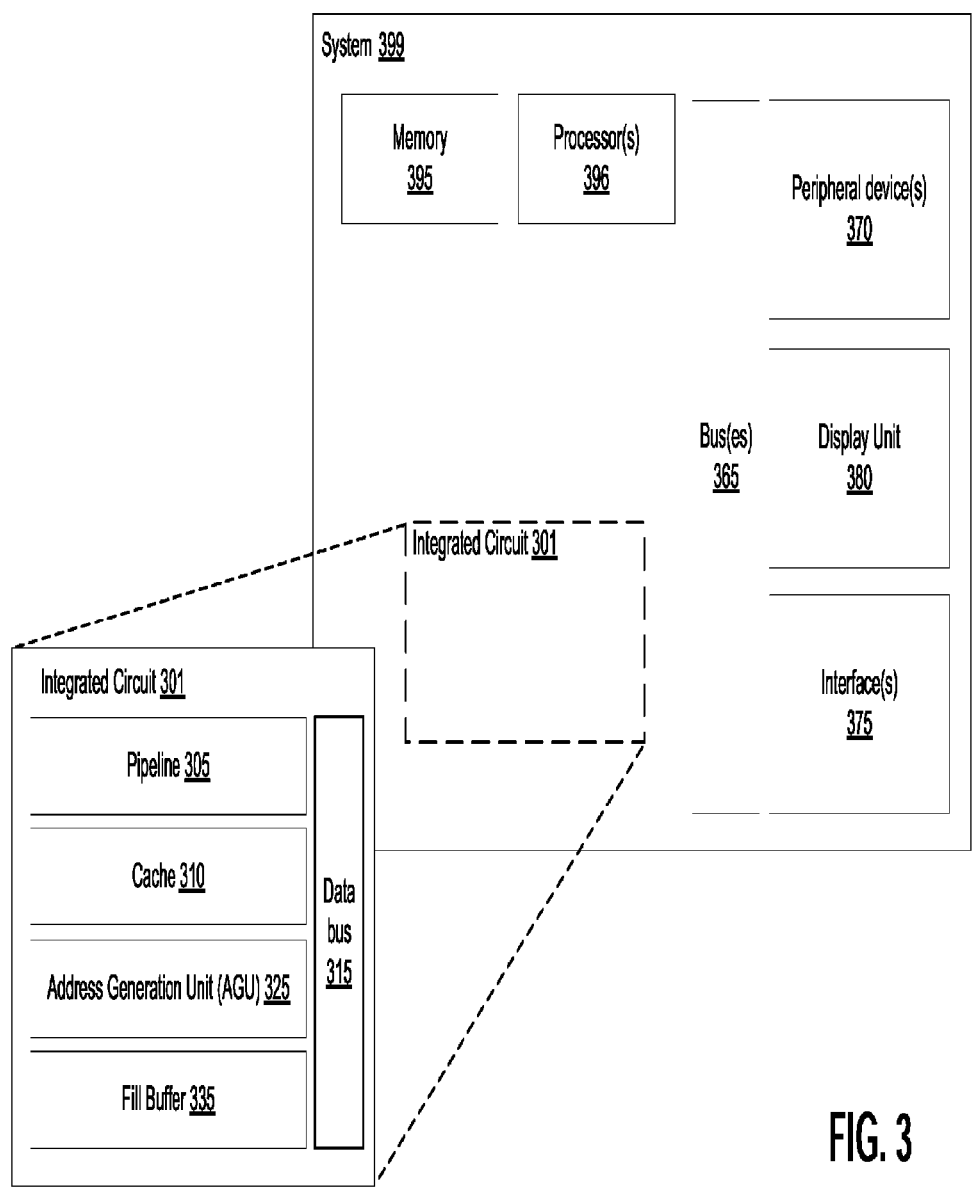
FIG. 3 shows a diagrammatic representation of a system in accordance with which embodiments may operate, be installed, integrated, or configured.

FIG. 3 shows a diagrammatic representation of a system 399 in accordance with which embodiments may operate, be installed, integrated, or configured.

In one embodiment, system 399 includes a memory 395 and a processor or processors 396. For example, memory 395 may store instructions to be executed and processor(s) 396 may execute such instructions. System 399 includes communication bus(es) 365 to transfer transactions, instructions, requests, and data within system 399 among a plurality of peripheral device(s) 370 communicably interfaced with one or more communication buses 365 and/or interface(s) 375. Display unit 380 is additionally depicted within system 399.

Distinct within system 399 is integrated circuit 301 which may be installed and configured in a compatible system 399, or manufactured and provided separately so as to operate in conjunction with appropriate components of system 399.

In accordance with one embodiment, system 399 includes at least a display unit 380 and an integrated circuit 301. The integrated circuit 301 may operate as, for example, an out-of-order processor or as another computing component of system 399. In such an embodiment, the integrated circuit 301 of system 399 includes at least: a data bus 315, a pipeline 305 to receive a store instruction in which the integrated circuit is to process out-of-order instructions and enforce in-order requirements for a cache 310; an Address Generation Unit (AGU) 325 to calculate a physical address for the store instruction; and a fill buffer 335 to pre-fetch a cache line based on the store instruction and the calculated physical address before the store instruction retires from the pipeline 305.

In accordance with one embodiment, such a system 399 embodies a tablet or a smartphone, in which the display unit 380 is a touchscreen interface of the tablet or the smartphone; and further in which the integrated circuit 301 is incorporated into the tablet or smartphone.

Figure 4:
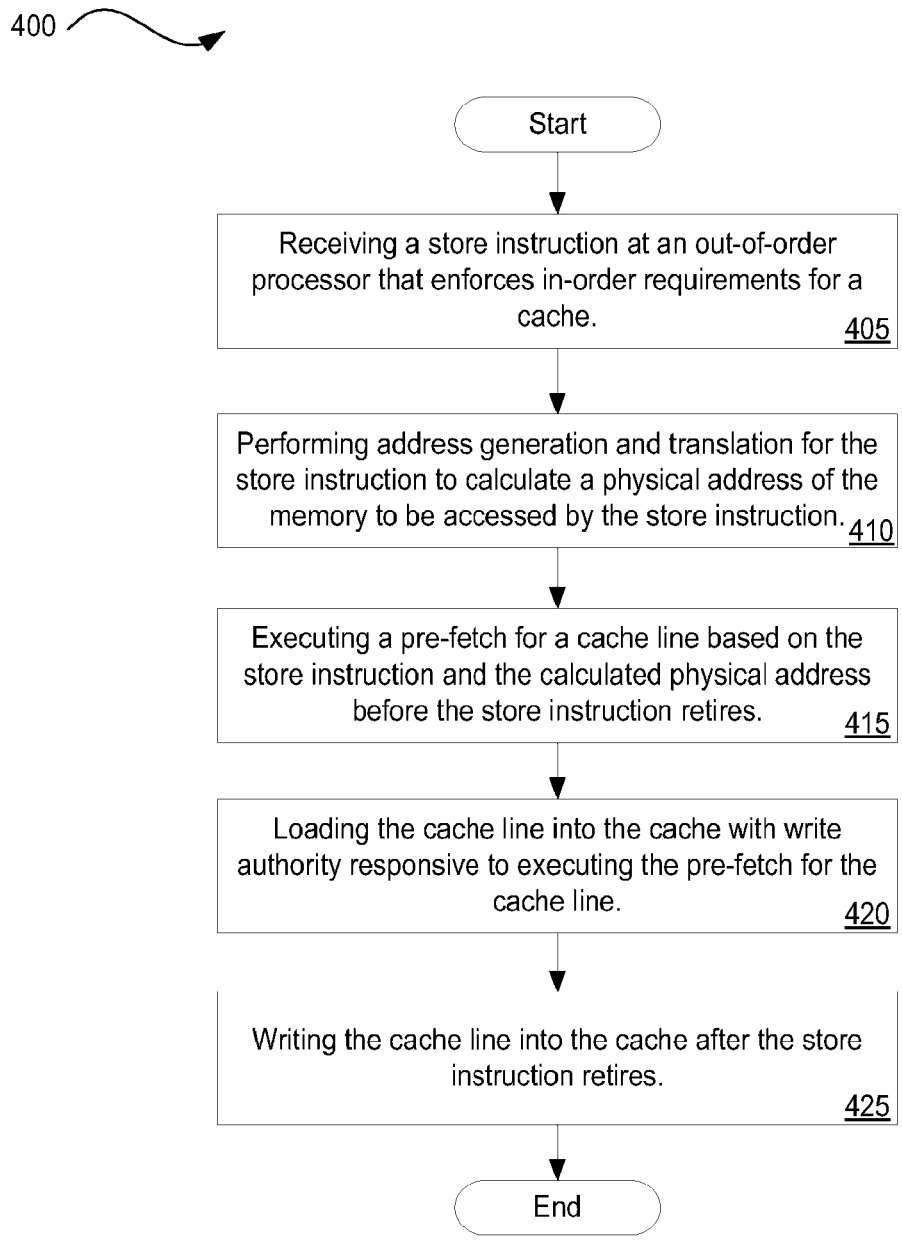
FIG. 4 is a flow diagram illustrating a method for cutting senior store latency using store prefetching in accordance with described embodiments.

FIG. 4 is a flow diagram illustrating a method for cutting senior store latency using store prefetching in accordance with described embodiments. Method 400 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 400 begins with processing logic for receiving a store instruction at an out-of-order processor that enforces in-order requirements for a cache (block 405).

At block 410, processing logic performs address generation and translation for the store instruction to calculate a physical address of the memory to be accessed by the store instruction.

At block 415, processing logic executes a pre-fetch for a cache line based on the store instruction and the calculated physical address before the store instruction retires.

At block 420, processing logic loads the cache line into the cache with write authority responsive to executing the pre-fetch for the cache line.

And at block 425, processing logic writes the cache line into the cache after the store instruction retires.

Figure 5A:
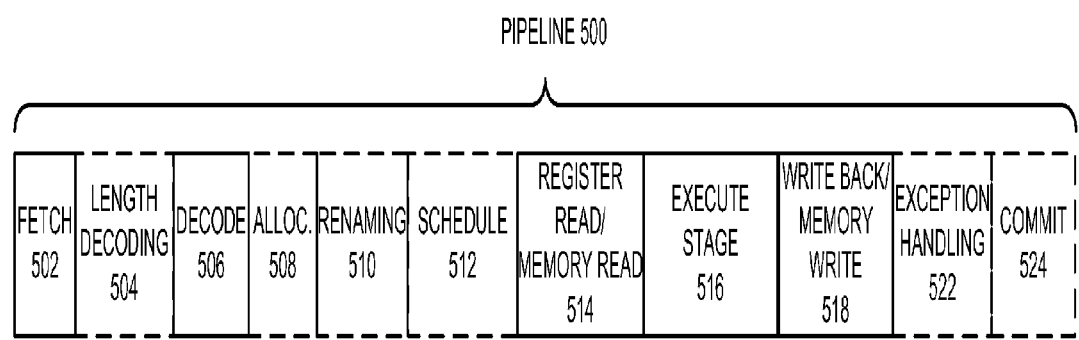
FIG. 5A is a block diagram illustrating both an exemplary in-order pipeline and an exemplary register renaming, out-of-order issue/execution pipeline in accordance with described embodiments.
Figure 5B:
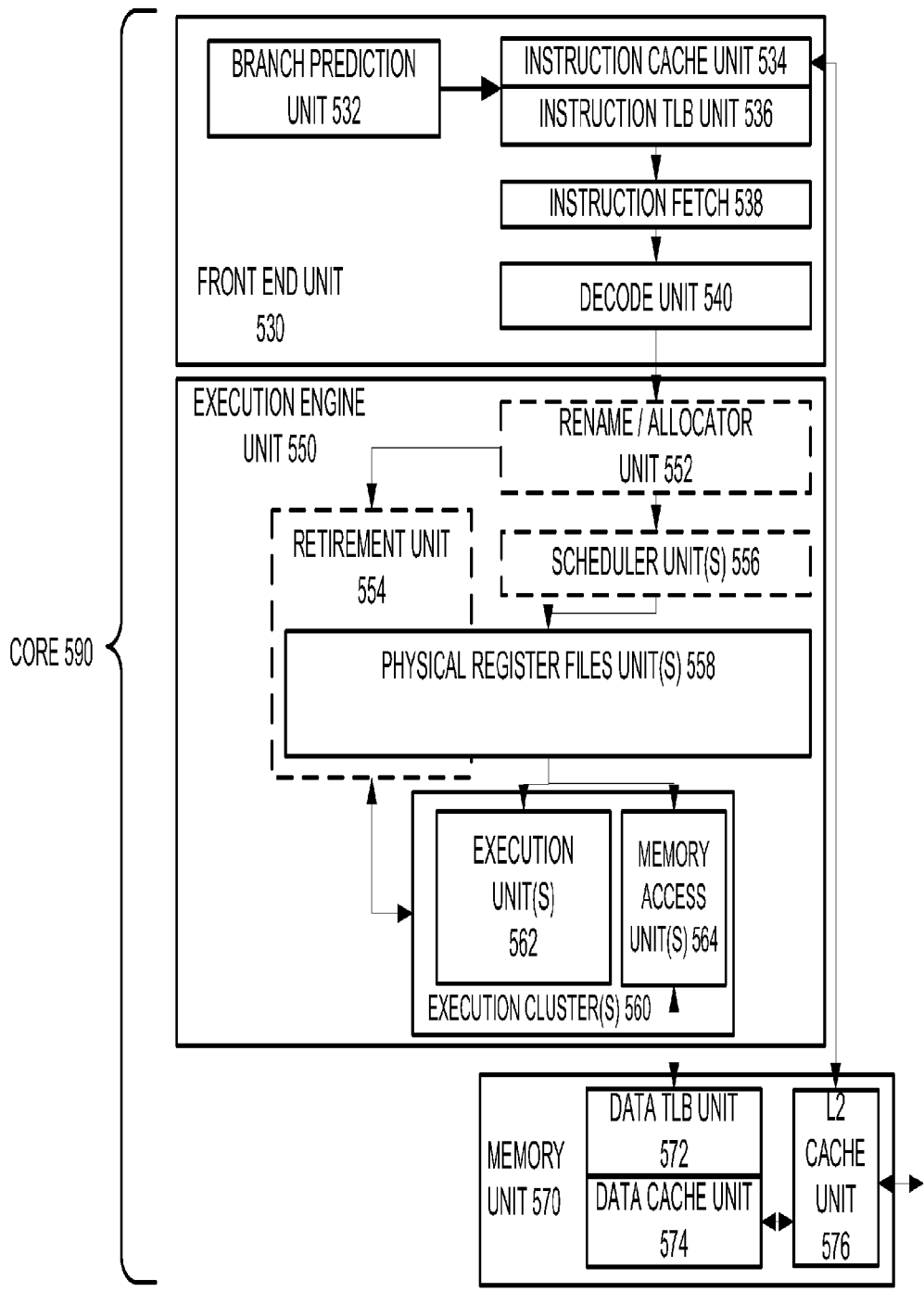
FIG. 5B is a block diagram illustrating both an exemplary embodiment of an in-order architecture core and an exemplary register renaming, out-of-order issue/execution architecture core to be included in a processor in accordance with described embodiments.

FIG. 5A is a block diagram illustrating both an exemplary in-order pipeline and an exemplary register renaming, out-of-order issue/execution pipeline in accordance with described embodiments. FIG. 5B is a block diagram illustrating both an exemplary embodiment of an in-order architecture core and an exemplary register renaming, out-of-order issue/execution architecture core to be included in a processor in accordance with described embodiments. The solid lined boxes in FIG. 5A and FIG. 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used by an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
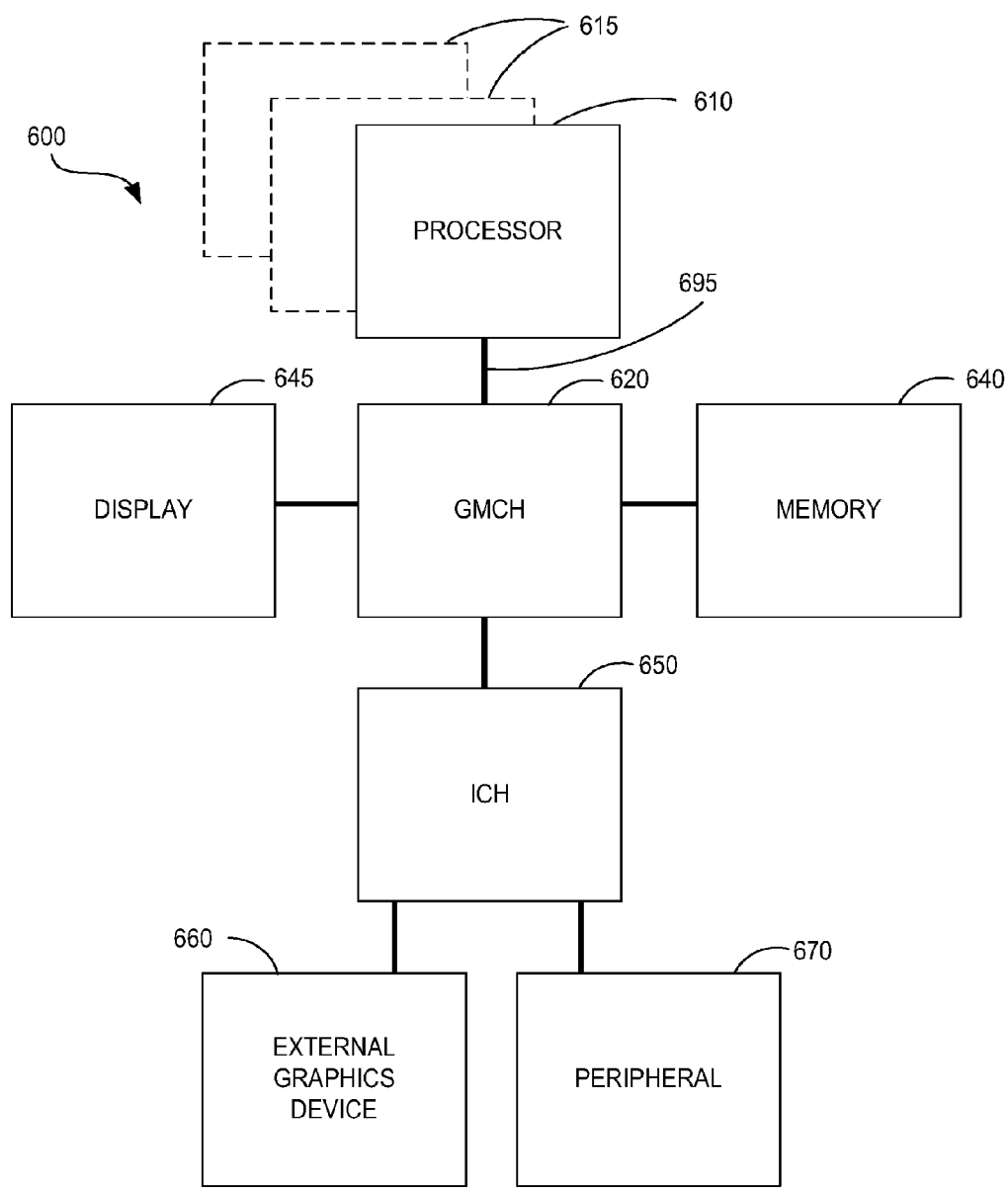
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
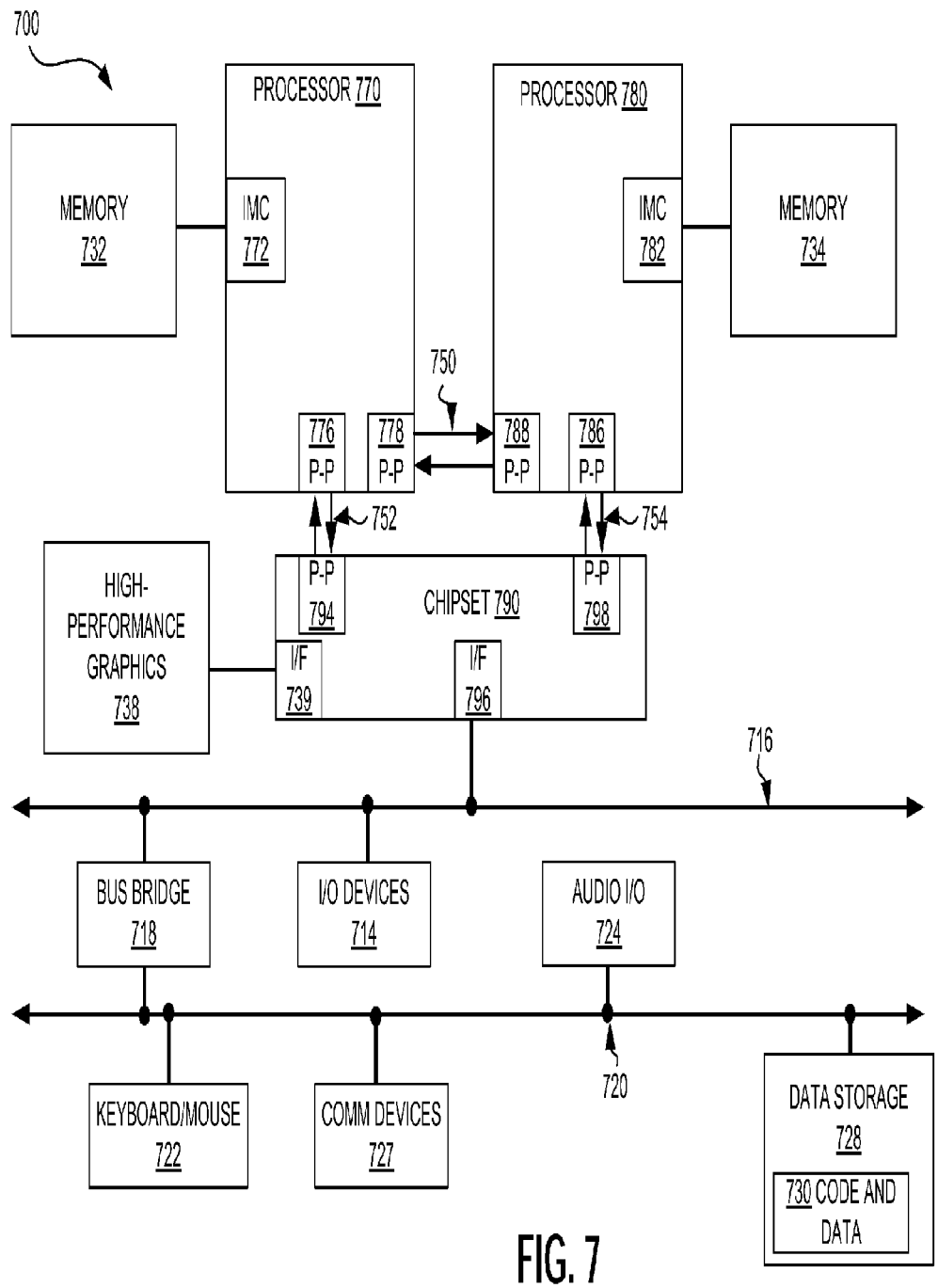
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
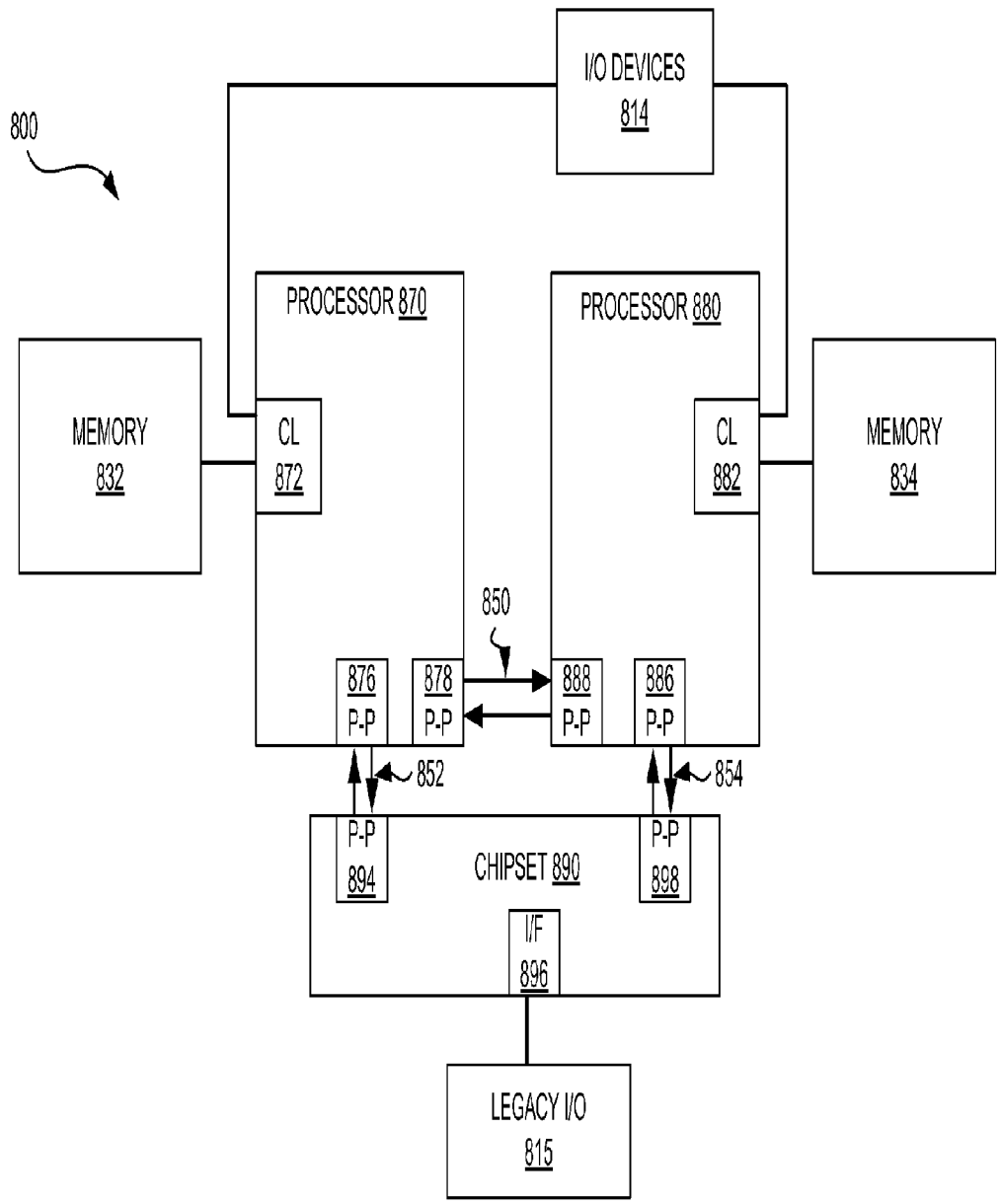
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
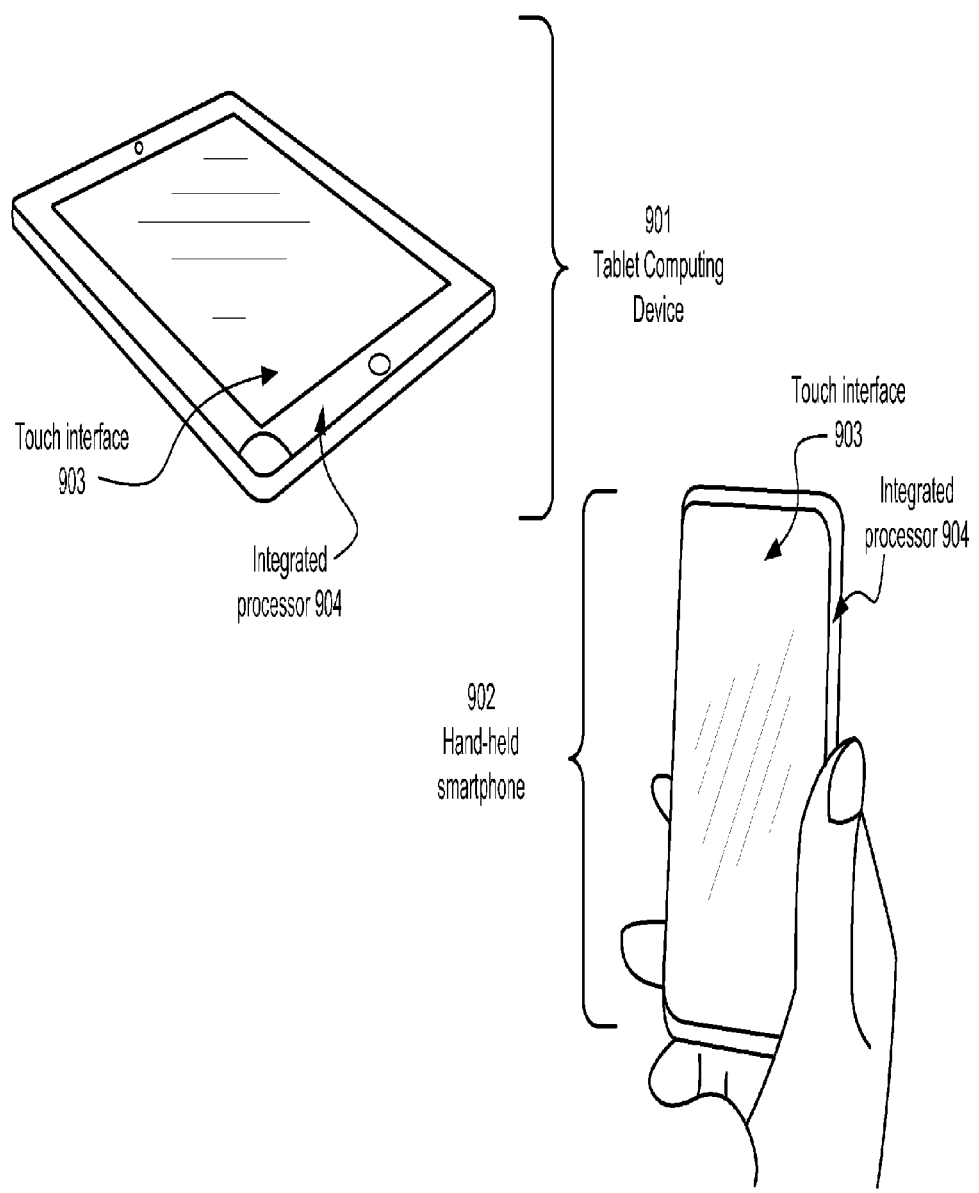
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for cutting senior store latency using store prefetching. In one embodiment, the integrated circuit described above or the depicted integrated processor of the tablet or smartphone is an integrated silicon processor functioning as a central processing unit for a tablet computing device or a smartphone.

For example, in accordance with one embodiment, a tablet computing device includes: a display unit; and an integrated circuit which may operate as, for example, an out-of-order processor, and further in which the integrated circuit includes: a data bus, a pipeline to receive a store instruction in which the integrated circuit is to process out-of-order instructions and enforce in-order requirements for a cache; an Address Generation Unit (AGU) to calculate a physical address for the store instruction; and a fill buffer to pre fetch a cache line based on the store instruction and the calculated physical address before the store instruction retires from the pipeline.

Figure 10:
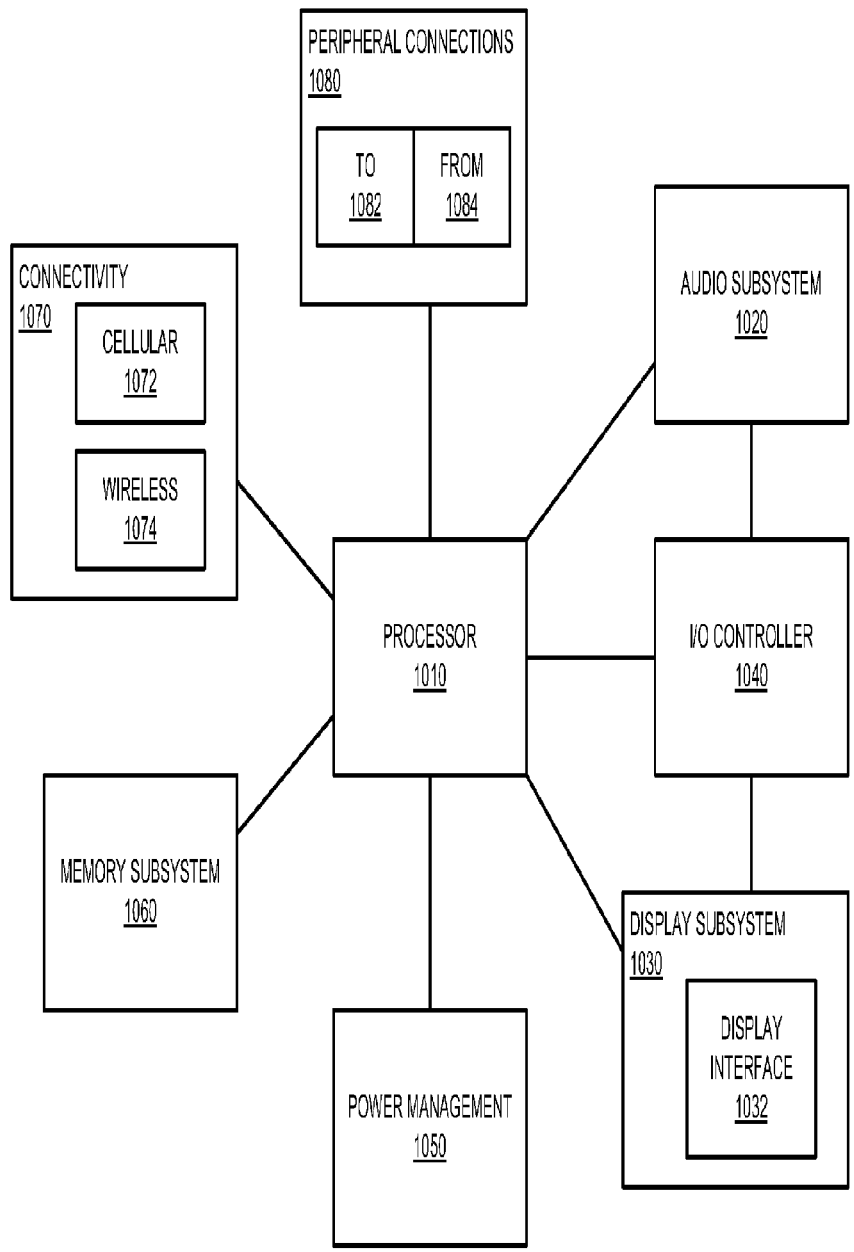
FIG. 10 is a block diagram of an embodiment of tablet computing device, a smartphone, or other mobile device in which touchscreen interface connectors are used.

FIG. 10 is a block diagram 1000 of an embodiment of tablet computing device, a smartphone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1010.

Display subsystem 1030 represents hardware (e.g., display devices) and software (e.g., drivers) components that provide a visual and/or tactile display for a user to interact with the tablet computing device or smartphone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smartphone through which a user might interact. In one embodiment, I/O controller 1040 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1050 that manages battery power usage, charging of the battery, and features related to power saving operation. Memory subsystem 1060 includes memory devices for storing information in the tablet computing device or smartphone. Connectivity 1070 includes hardware devices (e.g., wireless and/or wired connectors and communication hardware) and software components (e.g., drivers, protocol stacks) to the tablet computing device or smartphone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smartphone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
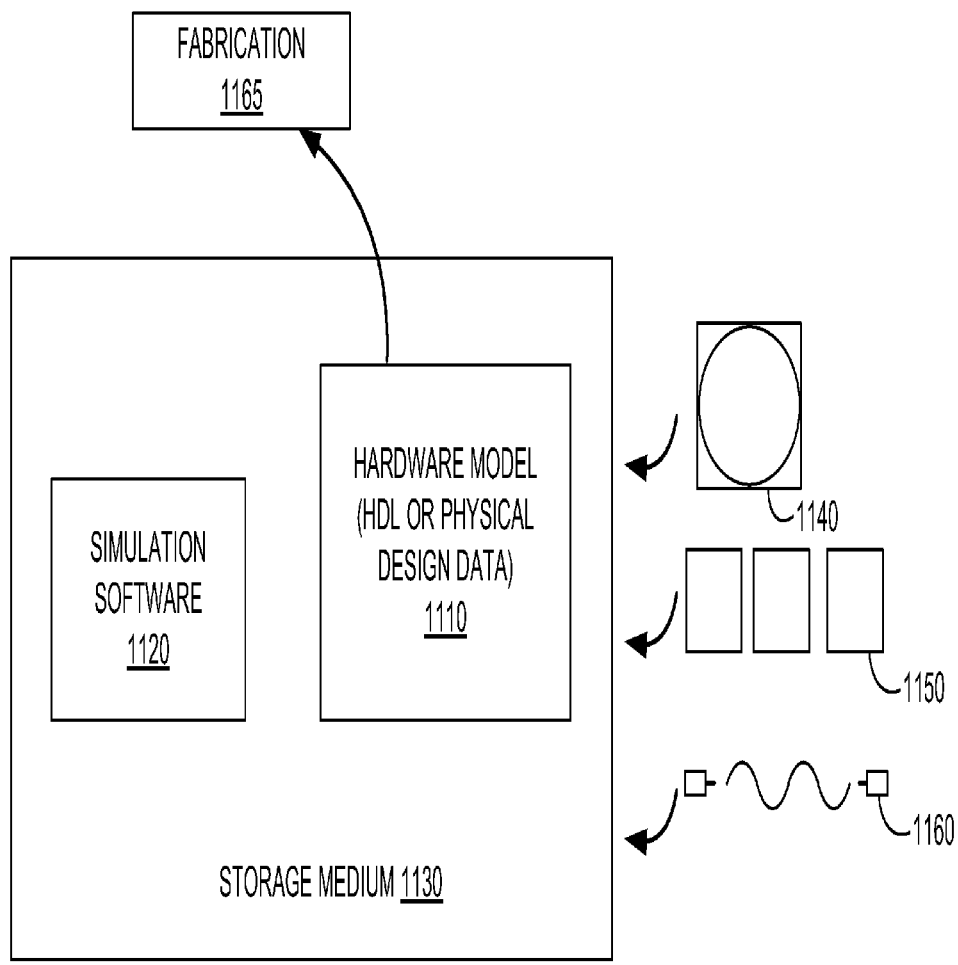
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
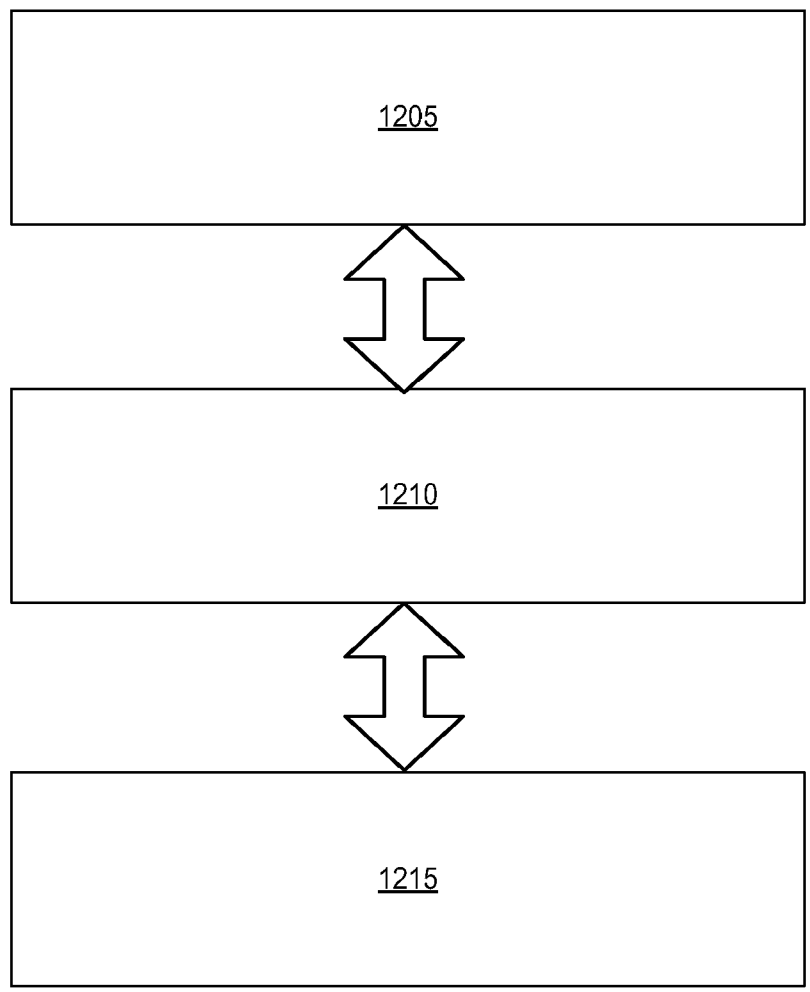
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
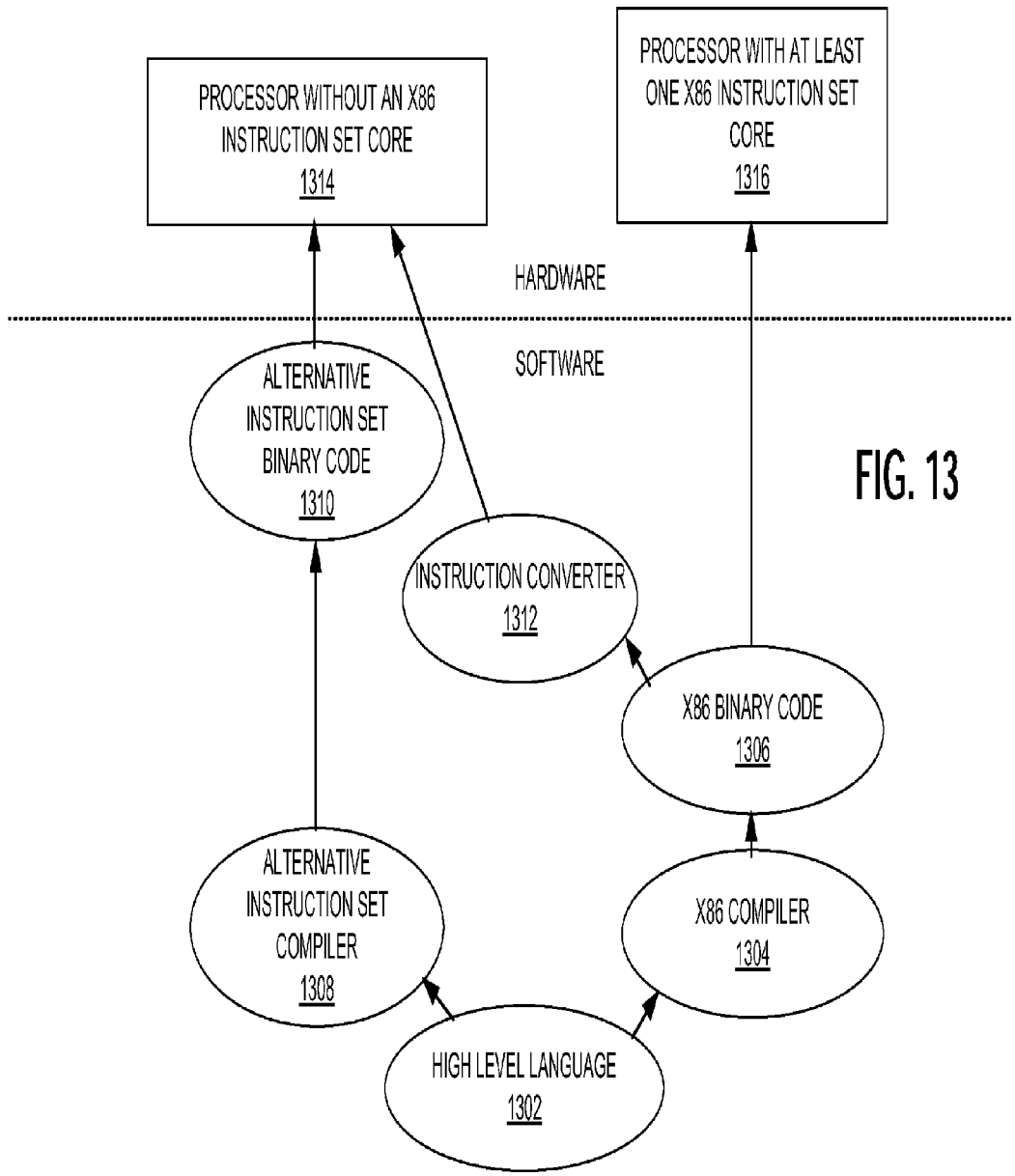
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   receiving an instruction, wherein the received instruction is a store instruction, at an out-of-order processor, wherein the out-of-order processor enforces in-order requirements for a cache;
   performing address generation and translation for the store instruction to calculate a physical address of the memory to be accessed by the store instruction; and
   in response to the received instruction being the store instruction, executing a pre-fetch operation for a cache line data based on the store instruction and for the same calculated physical address while the store instruction is pending and before the store instruction retires.

2. The method of claim 1:
wherein the out-of-order processor comprises a pipeline;
wherein receiving the store instruction at the out-of-order processor comprises receiving the store instruction at the pipeline.

3. The method of claim 2, wherein executing the pre-fetch for the cache line before the store instruction retires comprises executing the pre-fetch for the cache line before the store instruction retires from the pipeline.

4. The method of claim 2, wherein the store instruction is subject to one of the following events:
retirement from the pipeline pursuant to an accurate instruction prediction;
a pipeline flush event pursuant to an instruction mis-prediction, wherein the pipeline flush event results in the store instruction rendered obsolete.

5. The method of claim 1, wherein executing the pre-fetch for the cache line comprises requesting write authority to the cache line within the cache.

6. The method of claim 5:
wherein the cache comprises a Level 1 cache (L1 cache); and
wherein the executing the pre-fetch for the cache line is a cache miss at the L1 cache.

7. The method of claim 6, wherein executing the pre-fetch for the cache line further comprises one or more of:
executing the pre-fetch against a higher level cache responsive to the cache miss; or
executing the pre-fetch against a system non-cache random access memory (RAM) communicably interfaced with the out-of-order processor responsive to the cache miss.

8. The method of claim 1, further comprising:
loading the cache line into the cache with write authority responsive to executing the pre-fetch for the cache line.

9. The method of claim 8, further comprising:
writing the cache line into the cache after the store instruction retires; and
deallocating a store buffer for the cache line.

10. The method of claim 1, further comprising:
identifying a pre-existing pre-fetch operation for the same cache line; and
promoting the pre-existing pre-fetch operation to a senior store.

11. The method of claim 10, wherein promoting the pre-existing pre-fetch operation to the senior store comprises:
identifying a fill buffer allocated to bring the cache line from a memory into the cache pursuant to the pre-existing pre-fetch operation;
modifying an attribute of the fill buffer from indicating a pre-fetch operation to indicating a senior store operation; and
wherein promoting the pre-existing pre-fetch operation to the senior store fulfills the pre-fetch for the cache line.

12. The method of claim 10, wherein promoting the pre-existing pre-fetch operation to the senior store comprises:
determining the pre-fetch for the cache line has not completed;
identifying a fill buffer allocated to bring the cache line from a memory into the cache pursuant to the pre-existing pre-fetch operation;
overwriting an attribute of the fill buffer from indicating the pre-existing pre-fetch operation with an attribute indicating a senior store; and
wherein promoting the pre-existing pre-fetch operation to the senior store fulfills the pre-fetch for the cache line.

13. The method of claim 1, wherein the out-of-order processor enforces the in-order requirements for a cache by:
requiring that stores to the cache pursuant to store instructions received at the out-of-order processor are made visible external to the out-of-order processor in strict order, wherein the strict order is identical in sequence to a program order being executed by the out-of-order processor.

14. The method of claim 1, further comprising:
determining the pre-fetch for the cache line has not completed;
determining a Global Observation point has been reached for the pre-fetch; and
hiding a Global Observation point from being visible external to the out-of-order processor preventing access to the cache line from entities external to the out-of-order processor.

15. The method of claim 14, further comprising:
determining all previous senior stores are associated with a corresponding Global Observation point; and
un-hiding the Global Observation point for the pre-fetch allowing the pre-fetch to receive a Global Observation point time-stamp subsequent to all previous stores to ensure in-order requirements of the out-of-order processor.

16. An integrated circuit comprising:
a data bus;
a pipeline to receive an instruction, wherein the received instruction is a store instruction, wherein the integrated circuit to process out-of-order instructions and enforce in-order requirements for a cache;
an Address Generation Unit (AGU) to calculate a physical address for the store instruction; and
a fill buffer to, in response to the received instruction being the store instruction, pre-fetch a cache line based on the same store instruction and for the same calculated physical address while the store instruction is pending and before the store instruction retires from the pipeline.

17. The integrated circuit of claim 16, wherein the integrated circuit comprises a Central Processing Unit (CPU).

18. The integrated circuit of claim 16, wherein the CPU comprises an out-of-order processor.

19. The integrated circuit of claim 16, wherein the integrated circuit comprises a central processing unit for one of a tablet computing device or a smartphone.

20. A system comprising:
a display unit; and
an integrated circuit, wherein the integrated circuit comprises:
a data bus,
an out-of-order pipeline to receive an instruction, wherein the received instruction is a store instruction, wherein the integrated circuit to process out-of-order instructions and enforce in-order requirements for a cache,
an Address Generation Unit (AGU) to calculate a physical address for the store instruction, and
a fill buffer to, in response to the received instruction being the store instruction, pre-fetch a cache line based on the same store instruction and for the same calculated physical address while the store instruction is pending and before the store instruction retires from the pipeline, wherein stores to a cache pursuant to a store instruction are made visible external to the out-of-order pipeline in strict order, wherein the strict order is identical in sequence to a program order being executed by the out-of-order pipeline.

21. The system of claim 20:
wherein the system embodies a tablet or a smartphone;
wherein the display unit comprises a touchscreen interface of the tablet or the smartphone; and
wherein the integrated circuit is incorporated into the tablet or smartphone.

22. A tablet computing device comprising:
a display unit; and
an integrated circuit, wherein the integrated circuit comprises:
  a data bus,
  a pipeline to receive an instruction, wherein the received instruction is a store instruction, wherein the integrated circuit to process out-of-order instructions and enforce in-order requirements for a cache,
an Address Generation Unit (AGU) to calculate a physical address for the store instruction, and
a fill buffer to, in response to the received instruction being the store instruction, pre-fetch a cache line based on the same instruction and for the same calculated physical address while the store instruction is pending and before the store instruction retires from the pipeline.

\* \* \* \* \*